United States Patent [19]

Wood et al.

[11] Patent Number: 5,559,873
[45] Date of Patent: Sep. 24, 1996

[54] TELEPHONE PRIVACY DEVICE WITH CONFERENCE AND INDICATOR FEATURES

[75] Inventors: Samuel F. Wood, Los Altos; Gaylan I. Larson, San Jose, both of Calif.

[73] Assignee: Notify Corporation, San Jose, Calif.

[21] Appl. No.: 355,963

[22] Filed: Dec. 14, 1994

[51] Int. Cl.$^6$ ............................. H04M 1/00; H04M 1/60; H04M 13/00; H04M 3/00
[52] U.S. Cl. ..................... 379/161; 379/168; 379/184; 379/380; 379/194
[58] Field of Search ............................. 379/161, 168, 379/169, 184, 194, 195, 199, 373, 387, 177, 7, 35, 380

[56] References Cited

U.S. PATENT DOCUMENTS

| | | | |
|---|---|---|---|
| 3,875,342 | 4/1975 | Stern | 379/195 |
| 4,243,844 | 1/1981 | Waldman | 379/442 |
| 4,332,983 | 6/1982 | Vakili | 379/177 |
| 4,941,166 | 7/1990 | Waldman et al. | 379/161 X |

*Primary Examiner*—Stephen Chin
*Assistant Examiner*—Paul Loomis

*Attorney, Agent, or Firm*—Marger, Johnson, McCollom & Stolowitz PC

[57] ABSTRACT

A simple and inexpensive telephone exclusion or privacy device. A conference feature is and am indicator light showing when the line is in use are also provided. The basic exclusion or privacy circuit includes only eleven components, thereby providing a very low cost device. The circuit includes a diode bridge with a Silicon Controlled Rectifier (SCR) connected across the midpoint of the bridge circuit. A resistor in series with the SCR limits the amount of current which the SCR can draw from the telephone line. A Zener diode in series with a resistor is connected between the anode and the gate of the SCR and a resistor in series with a capacitor is connected from the gate of the SCR to the second side of the bridge circuit i.e. to the point where the cathode of the SCR is connected. The breakdown voltage of the Zener diode is chosen so that at normal out of use line voltage (nominally 48 volts) the SCR will be placed into a conducting state and thus when someone picks up the handset they can access a line which includes the device. However, if a line is in use and someone picks up another handset which includes one of these devices, the line voltage will only be twelve volts and the SCR will not be turned on, thereby presenting the second handset with an open circuit.

12 Claims, 3 Drawing Sheets

5,559,873

TELEPHONE PRIVACY DEVICE WITH CONFERENCE AND INDICATOR FEATURES

FIELD OF THE INVENTION

The present invention relates to telephone systems and more particularly to devices for providing privacy in telephone systems where multiple phones have access to a telephone line.

BACKGROUND OF THE INVENTION

In a telephone system where multiple phones are connected to one telephone line, if someone is talking on one of the phones, another party can pick up a second phone and eavesdrop on the conversation. Likewise, if a fax machine or computer is transmitting information on a telephone line and someone picks up a phone connected to the same line, the fax or computer transmission can be interrupted.

Various devices have been proposed for solving this problem; however, the existing devices have various technical or cost disadvantages. For example U.S. Pat. No. 3,499,121 (Mcintosh) describes devices which can provide privacy; however, the devices described in the Mcintosh patent have a relatively large number of components and they are therefore costly. U.S. Pat. No. 4,726,048 (Waldman) shows a different type of device for providing privacy in a telephone system. The device shown in the Waldman patent only needs to be connected to one phone in a system and the phone to which the device is connected in effect become a master phone. If someone initiates a call on the master phone and at a later time someone picks up one of the extension phones, the person who initiated the call will be cut off and only the person using the extension phone will have access to the line.

The present invention provides a telephone privacy or exclusion device which does not have the disadvantages of the prior art privacy or exclusion devices.

SUMMARY OF THE INVENTION

The present invention provides a simple and inexpensive telephone exclusion or privacy device. The invention also provides a conference feature and an indicator showing that a line is in use. The privacy circuit of the present invention including a conferencing feature, requires only eleven components, thereby providing a very low cost, simple and easily manufactured device. The privacy circuit includes a diode bridge with a Silicon Controlled Rectifier (SCR) connected across the midpoint of the bridge. A resistor in series with the SCR limits the amount of current which the SCR can draw from the telephone line. A Zener diode in series with a resistor is connected between the anode and the gate of the SCR and a resistor in series with a capacitor is connected from the gate of the SCR to the second side of the bridge (i.e to the point in the bridge where the cathode of the SCR is connected). The breakdown voltage of the Zener diode is chosen so that when the normal "on-hook" line voltage (nominally 48 volts) appears across the bridge circuit, the SCR will be placed into a conducting state. Thus, when someone picks up a handset connected to a line which is not in use, about 48 volts appears across the bridge circuit, the SCR begins conducting and the handset can access the line. However, if a line is in use and someone picks up a handset connected to the line, the line voltage will only be about twelve volts, the SCR will not be turned on and the handset will not be able to access the line. A capacitor connected to the gate of the SCR provides holding current for the SCR if the handset is momentarily flashed to allow another extension to be connected to the same line. This provides a conferencing feature.

Thus, the applicant's simple and inexpensive device provides privacy and it prevents a conversation, fax, or computer use of a line from being interrupted when someone picks up a second telephone connected to the same line.

DESCRIPTION OF A PREFERRED EMBODIMENT OF THE INVENTION

Figure 1:
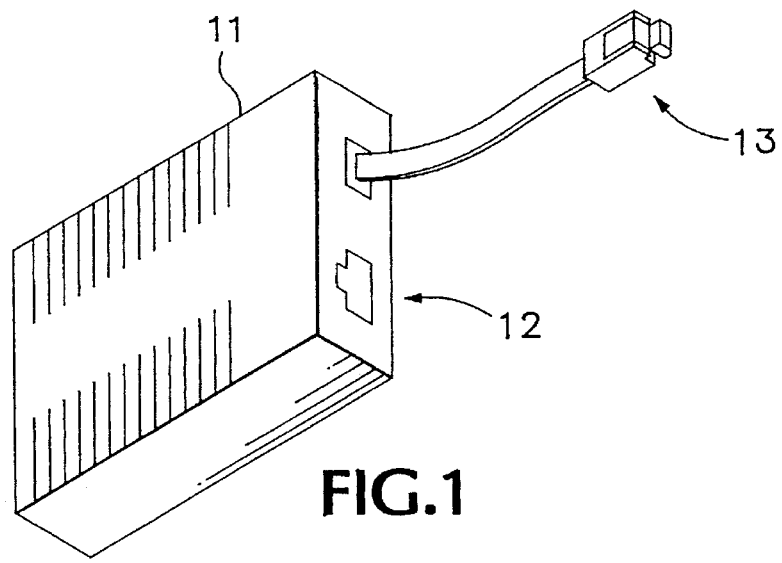
FIG. 1 is a perspective drawing of a preferred embodiment of the invention.
Figure 2:
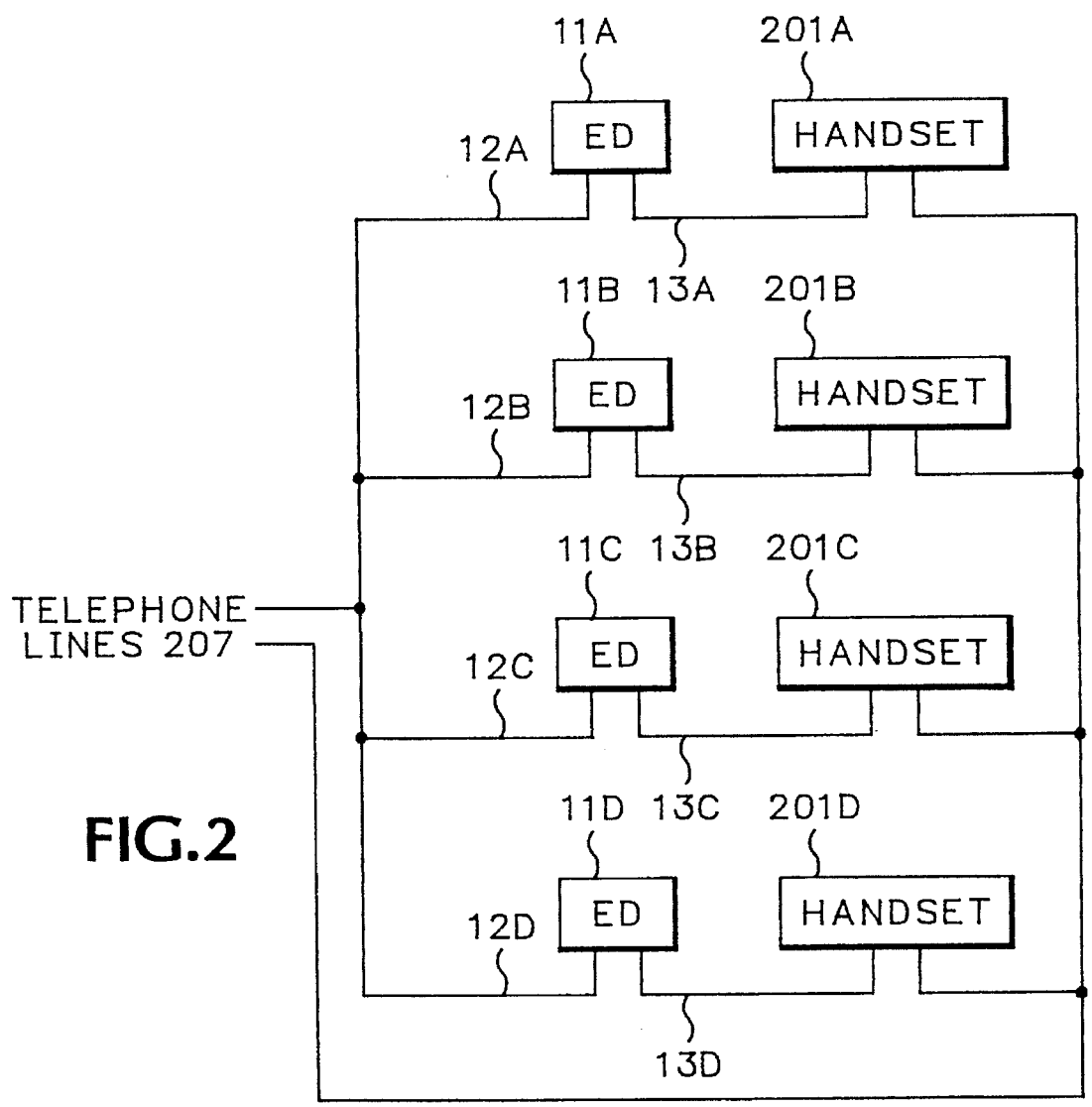
FIG. 2 shows how the device is connected in a system with multiple phones connected to one telephone line.

FIG. 1 is a perspective view of a preferred embodiment of the invention. FIG. 2 shows how the device in FIG. 1 is connected in a telephone circuit. In FIG. 2, devices 11A, 11B, 11C, etc. are each devices such as device 11 shown in FIG. 1 and handsets 201A, 201B, 201C, etc. are identical telephone handsets. The handsets 201A, 201B, 201C etc. are generally referred to as handsets 201.

As shown in FIG. 1, the preferred embodiment of the the invention is a small box 11 which has circuitry mounted therein and two RJ-11 (standard telephone line connectors) designated 12 and 13. As shown in FIG. 2, connector 12 is connection to a telephone line or telephone circuit 207 and connector 13 is connected to a telephone handset 201.

Figure 3:
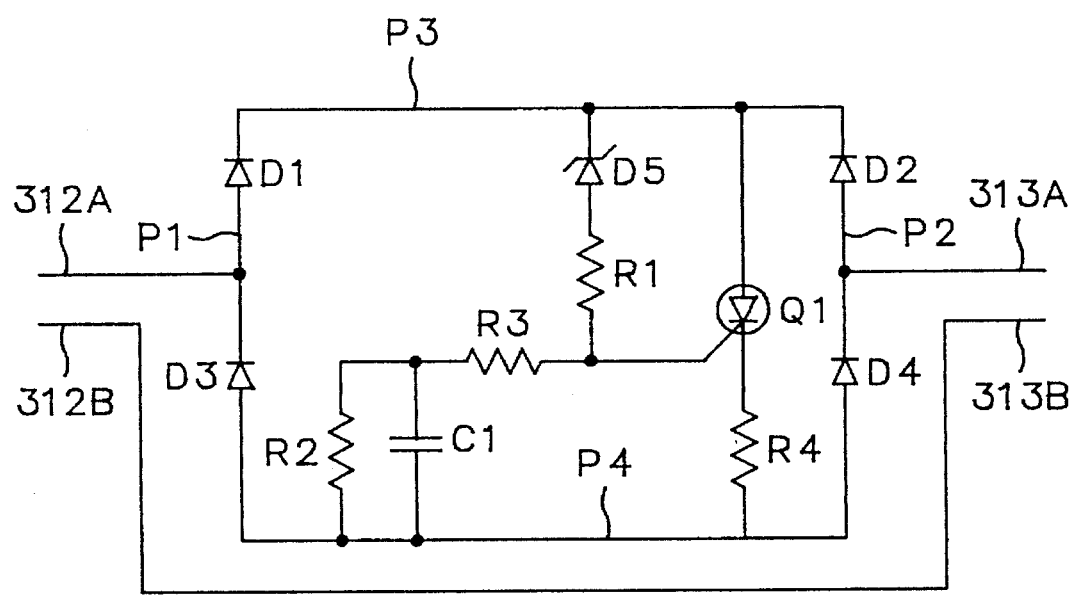
FIG. 3 is a circuit diagram of a first embodiment of the invention.

FIG. 3 is a detailed circuit diagram of a first preferred embodiment of the invention. As shown in FIG. 3 the device is connected between input circuit 312 (lines 312A and 312B form input circuit 312) and output circuit 313 (lines 313A and 313B form output circuit 313). Lines 312 and 313 are respectively connected to connectors 12 and 13 shown in FIG. 1.

Four diodes D1, D2, D3, and D4 form a bridge circuit. Points P1 and P2 of the bridge circuit are connected to the input and output lines 312A and 313A. The polarity between points P3 and P4 (which are the midpoints of the bridge circuit) is always the same irrespective of the polarity of the voltage on lines 312 and 313. The bridge circuit is necessary since one can not know which line in a telephone circuit will be positive and which will be negative.

Silicon controlled Rectifier (SCR) Q1 and resistor R4 are connected in series between points P3 and P4. When the SCR Q1 is in a conduction state, there is an effective connection between lines 312A and 313A and a handset connected to lines 313 will be connected to lines 312. However, when the SCR Q1 is in a non conduction state, there is an open circuit between lines 312A and 313A and a handset connected to lines 313A will not be able to be hear a conversation which is taking place on the lines 312.

The gate of SCR Q1 is connected to the series connection of Zener diode D5 and resistor R1. When the voltage between lines 312A and 313A is in the range of thirty eight to forty volts (as it is when the line is not in use and a handset connected to line 313 is placed off hook), Zener diode D5 conducts current and turns on the SCR Q1. Alternatively if the voltage between lines 312A and 313A is twelve or fourteen volts (as it is when the line is in use and a handset connected to line 313 is placed off hook) the Zener diode D5 will not conduct and SCR Q1 will not be placed in a conduction state. Once SCR Q1 is placed in a conductive state, it will continue to conduct until there is no further current through the circuit (i.e. when the handset in series with the circuit is placed on-hook there will be no current through the circuit). Resistor R1 limits the current flow through the Zener diode D5.

Capacitor C1 and resistors R2 and R3 are used for the conferencing feature of the circuit. When the handset connected to line 313 is flashed, that is, when the handset is momentarily placed on hook, the voltage on the line will increase and another phone which has one of the protective devices in series therewith will be able to access the line. When the handset is momentarily flashed, that is, momentarily placed on hook, capacitor C1 supplies current to the gate of SCR Q1 to maintain conduction through the SCR. When the SCR Q1 is conducting normally, about 20 ma of current flow through resistor R4 creating a potential of 0.6 volts. This charges capacitor C1 to a voltage which is 0.6 volts higher than the junction voltage of the gate and cathode of the SCR Q. When the current through the SCR is momentarily interrupted (by flashing the switch hook of the handset), only the gate current provided by C1 passes R4 and the voltage across R4 drops to approximately 0.01 volts. This drop in voltage across R4 allows C1 to supply current through R3 and through the gate cathode junction of SCR Q1, thus keeping the SCR Q1 in a conducting state. Since the SCR Q1 is maintained in a conducting state when the switch hook is flashed, when the switch hook returns to an off hook condition, the SCR Q1 will continue to conduct even though the voltage has been lowered due to the fact that another handset has been connected to the line. If one did not want to include the conferencing feature in the device, the capacitor C1 and the resistors R2 and R3 could be eliminated from the circuit.

In the preferred embodiment shown in FIG. 3, SCR Q1 is a commercially available SCR identified by the device type number MCR100-3. Diodes D1 to D4 are diodes commercially available as 1N4003. Resistor R4 is a 33 ohms resistor, R1 and R3 are 10 K ohm resistors, R2 is a 100 K ohm resistor, and capacitor C1 is a 33 uF capacitor.

Figure 4:
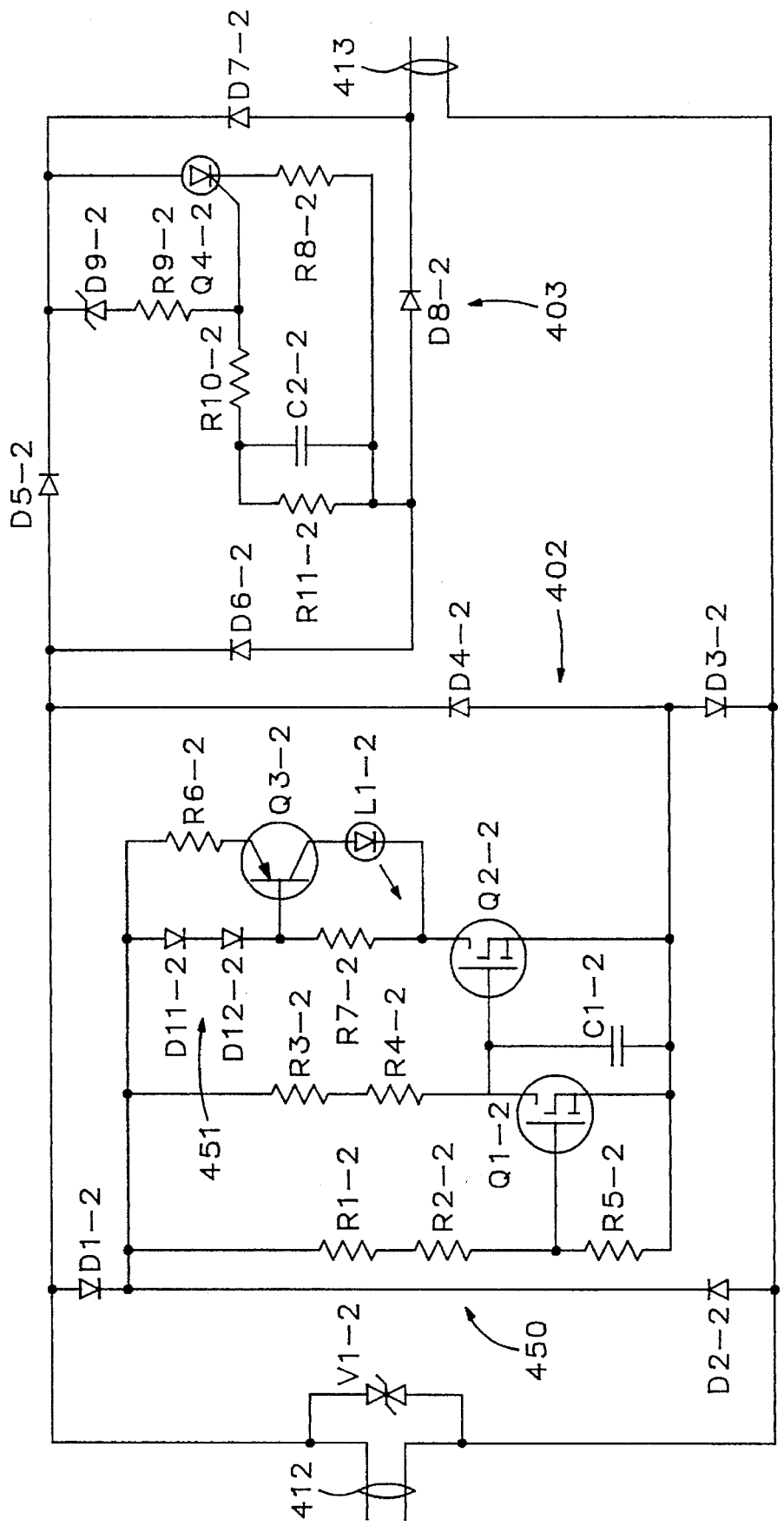
FIG. 4 is a circuit diagram of a second embodiment of the invention.

A second preferred embodiment of the invention is shown in FIG. 4. The embodiment shown in FIG. 4 has an indicator L1-2 which shows when the line is in use. The circuit shown in FIG. 4 has three main components, namely surge protector 401, circuit 402 which is associated with the indicator light, and circuit 403 which provides the privacy function. Input lines 412 go to connector 12 shown in FIG. 1 and output lines 413 go to connector 13 shown in FIG. 1.

Circuit 403 is identical to the circuit shown in FIG. 3, an thus it will not be described further. Circuit 401 consists of a sidactor V1-2 which clamps to a safe voltage any momentary voltages surges that appear on the telephone line. Sidactor V1-2 is a commercially available device which is commercially identified as a P2600B70.

The indicator driver circuit 402 has four main parts.

First: there is a bridge circuit formed by diodes D1-2, D2-2, D3-2 and D4-2. This bridge circuit insures that the voltage across the reminder of the circuit always has the same polarity.

Second: There is an inverter circuit 450 formed by resistors R1-2 to R5-2 and FET transistors Q1-2 and Q2-2. This inverter circuit is needed since the indicator is "on" when the line is in a low voltage or in-use state and the indicator is "off" when the line is in a high voltage "not in use" state.

Third: There is the LED indicator L1-2 which is driven by transistor Q3-2.

Fourth: There is a current limiting circuit 451 formed by diodes D11-2 and D12-2, resistor R6-2 and transistor Q3-2.

The bridge circuit formed by diodes D1-2 to D4-2 is conventional and will not be described further. The inverter circuit 450 is controlled by the voltage divider formed by resistors R1-2, R2-2 and R5-2 which is connected to the gate of FET transistor Q1-2. When the line voltage is high (i.e. nominally 38 to 40 volts) transistor Q1-2 is turned "on". When Q1-2 is turned "on" the gate of FET Q2-2 is held at a low voltage and it is turned off. Alternatively, when the line voltage is low, Q1-2 is turned "off" and Q2-2 is turned on. Resistors R3-2 and R4-2 limit the current through FET Q1-2. When Q2-2 is turned on, current flows through diodes D11-2 and D12-2 and resistor R7-2. The current through the diodes D11-2 and D12-2 turns transistor Q3-2 "On", thereby activating light emitting diode L1-2 and giving an indication that the line is in use.

When conducting current, diodes D11-2 and D12-2 each have a voltage drop of 0.6 volts. Thus, the total voltage across resistor R6-2 and across the emitter base junction of Q3-2 cannot exceed 1.2 volts. This effectively provides a constant current source through transistor Q3-2 and thus limits the current through the LED L1-2.

In the specific second embodiment shown herein, resistor R1-2 to R4-2 are each 22 m ohms, resistor R5-2 is 4.3M ohms, resistor R6-2 is 330 ohms, resistor R7-2 is 56 K ohms, Q1-2 is a 2N7000 FET, Q2-2 is a IRFU10 FET, diodes D11-2 and D12-2 are 1N4148 diodes, transistor Q3-2 is a MPSA-92 transistor and LED L1-2 is a HLPM-1700 LED.

While the invention has been shown and illustrated with respect to preferred embodiments thereof, it should be understood that various changes made be made in form and detail without departing from the spirit and scope of the invention. The invention is limited only by the limitations in the appended claims.

I claim:

1. A telephone privacy device for a telephone line which has a nominal off line voltage and a nominal on line voltage, said device including a bridge circuit which has input points and midpoints, a Silicon Controlled Rectifier (SCR) with a resistor in series therewith connected across said midpoints of said bridge circuit, a Zener diode in series with a current limiting resistor connected from the anode of said SCR to the gate of said SCR, the threshold of said Zener diode being less than said nominal off voltage and more than said nominal on voltage.

2. The device in claim 1 including a capacitor in series with a resistor connected between the gate and the cathode of said SCR, whereby said SCR remains in the conduction mode when the current through said privacy device is interrupted for a short period of time.

3. The device in claim 1 including an indicator circuit which gives an indication when said circuit is in use.

4. The device in claim 3 wherein said indicator circuit includes a bridge circuit connected across said lines, an inverter connected across the mid points of said bridge, a constant current source and an indictor, said inverter connected across the midpoint of said bridge, and said inverted connected to control said constant current source, said constant current source connected to provide current to said indicator.

5. A privacy device for a telephone system where at least first and second handsets are connected to a telephone circuit which has first and second lines, said privacy device being connected between said first handset and said telephone line, said privacy device comprising, a bridge circuit connected in series with one of said lines, a Silicon Controlled Rectifier (SCR) which has an anode, a cathode and a gate connected with said anode and said cathode in series with a resistor connected across the midpoints of said bridge circuit, and a Zener diode in series with a resistor connected between the anode of said SCR and the gate of said SCR, the breakdown voltage of said Zener diode being less than the nominal on voltage of said telephone circuit and more than the nominal off voltage of said telephone circuit.

6. The device in claim 5 including a capacitor in series with a resistor connected between the gate and the cathode of said SCR, whereby said SCR remains in the conduction mode when the current through said privacy device is interrupted for a short period of time.

7. The device in claim 5 including an indicator circuit which gives an indication when said circuit is in use.

8. The device in claim 7 wherein said indicator circuit includes a bridge circuit connected across said lines, an inverter connected across the mid points of said bridge, a constant current source and an indictor, said inverter connected across the midpoint of said bridge, and said inverted connected to control said constant current source, said constant current source connected to provide current to said indicator.

9. A telephone exclusion circuit for a telephone circuit which has an on hook and an off hook voltage, said exclusion circuit comprising, a bridge circuit connected in series with said telephone circuit, a Silicon Controlled Rectifier (SCR) which has an anode and a gate and which is connected in series with a resistor connected across the midpoint of said bridge circuit and a Zener diode in series with a current limiting resistor connected from said gate to said anode, said Zener diode having a breakdown voltage less than the on hook voltage of said telephone circuit and more than the off hook voltage of said telephone circuit, whereby said exclusion circuit conducts current when the voltage across said circuit is more than said off hook voltage and whereby said circuit does not conduct current when the voltage across said circuit is less than said off hook voltage.

10. The device in claim 9 including a capacitor in series with a resistor connected between the gate and the cathode of said SCR, whereby said SCR remains in the conduction mode when the current through said privacy device is interrupted for a short period of time.

11. The device in claim 9 including an indicator circuit which gives an indication when said circuit is in use.

12. The device in claim 11 wherein said indicator circuit includes a bridge circuit connected across said lines, an inverter connected across the mid points of said bridge, a constant current source and an indictor, said inverter connected across the midpoint of said bridge, and said inverted connected to control said constant current source, said constant current source connected to provide current to said indicator.

\* \* \* \* \*